(12) United States Patent
Bird et al.

(10) Patent No.: US 9,390,147 B2
(45) Date of Patent: Jul. 12, 2016

(54) SYSTEM AND METHOD FOR STORING STREAM DATA IN DISTRIBUTED RELATIONAL TABLES WITH DATA PROVENANCE

(71) Applicant: Red Lambda, Inc., Longwood, FL (US)

(72) Inventors: Robert Bird, Longwood, FL (US); Adam Leko, Longwood, FL (US); Matthew Whitlock, Longwood, FL (US)

(73) Assignee: Red Lambda, Inc., Longwood, FL (US)

( * ) Notice: Subject to any disclaimer, the term of this patent is extended or adjusted under 35 U.S.C. 154(b) by 256 days.

(21) Appl. No.: 13/625,434

(22) Filed: Sep. 24, 2012

(65) Prior Publication Data
US 2013/0080393 A1 Mar. 28, 2013

Related U.S. Application Data

(60) Provisional application No. 61/538,446, filed on Sep. 23, 2011.

(51) Int. Cl.
*G06F 17/30* (2006.01)

(52) U.S. Cl.
CPC .... *G06F 17/30551* (2013.01); *G06F 17/30309* (2013.01); *G06F 2201/84* (2013.01)

(58) Field of Classification Search
CPC .......... G06F 17/30551; G06F 2201/84; G06F 17/30309
USPC ................................................. 707/649, 748
See application file for complete search history.

(56) References Cited

U.S. PATENT DOCUMENTS

| | | | | |
|---|---|---|---|---|
| 6,122,640 A * | 9/2000 | Pereira | ........................ | 707/648 |
| 6,349,310 B1 * | 2/2002 | Klein et al. | ................... | 707/703 |
| 6,631,374 B1 * | 10/2003 | Klein | ................ | G06F 17/30551 |
| | | | | 707/638 |
| 7,117,341 B2 | 10/2006 | Khu | | |
| 7,257,606 B2 * | 8/2007 | Kapoor | ............ | G06F 17/30067 |
| 7,519,625 B2 * | 4/2009 | Honami | ........... | G06F 17/30088 |
| | | | | 707/649 |
| 7,539,867 B2 | 5/2009 | Bolosky et al. | | |
| 7,711,709 B2 * | 5/2010 | Mittal | ............... | G06F 17/30592 |
| | | | | 707/639 |
| 7,725,470 B2 | 5/2010 | Richards et al. | | |
| 7,856,502 B2 | 12/2010 | Lamport et al. | | |

(Continued)

OTHER PUBLICATIONS

Chang et al., "Bigtable: A Distributed Storage System for Structured data", in OSDI 2006, 14 pages, accessed online at <http://static.googleusercontent.com/media/research.google.com/en//archive/bigtable-osdi06.pdf> on Mar. 17, 2016.*

(Continued)

*Primary Examiner* — Phuong Thao Cao

(74) *Attorney, Agent, or Firm* — William G. Giltinan; Carlton Fields Jorden Burt, PA

(57) ABSTRACT

A system, a method and a computer readable medium for storing data elements and related data provenance information. The data elements may be represented in a hyper-table having rows and columns which may be indexed. The data-values of the corresponding data-elements in the hyper-cells may be retrieved based on the indices. Snapshots of the indices may be generated at pre-determined time periods. Checkpoints of the hyper-table may be generated at time periods that are based on transactions on the hyper-table. The hyper-table is capable of being queried as the hyper-table existed at certain time-periods, and data-values of the data-elements may be retrieved as the data-elements existed at such time-periods.

32 Claims, 4 Drawing Sheets

Representing data-elements in a hyper-table — 21

Generating indices of hyper-rows and hyper-columns — 22

Generating snapshots of the indices — 23

Generating checkpoints of the hyper-table — 24

(56) References Cited

U.S. PATENT DOCUMENTS

| | | | |
|---|---|---|---|
| 7,979,441 B2 | 7/2011 | Sim-Tang | |
| 8,010,514 B2 | 8/2011 | Zhang et al. | |
| 8,078,655 B2* | 12/2011 | Grubov et al. | 707/610 |
| 8,370,732 B2 | 2/2013 | Black et al. | |
| 8,473,778 B2 | 6/2013 | Simitci et al. | |
| 8,671,076 B2* | 3/2014 | Price | G06F 17/30371 707/649 |
| 2003/0167380 A1* | 9/2003 | Green et al. | 711/136 |
| 2004/0167906 A1* | 8/2004 | Smith et al. | 707/100 |
| 2004/0260722 A1* | 12/2004 | Allen | G06F 17/30887 |
| 2006/0206860 A1* | 9/2006 | Dardinski et al. | 717/105 |
| 2007/0204128 A1* | 8/2007 | Lee et al. | 711/173 |
| 2007/0288490 A1* | 12/2007 | Longshaw | G06F 11/1471 |
| 2008/0222219 A1* | 9/2008 | Varadarajan | G06F 17/30088 |
| 2008/0249990 A1* | 10/2008 | Baby | G06F 17/30911 |
| 2009/0037366 A1* | 2/2009 | Shankar | G06F 17/30336 |
| 2009/0172014 A1* | 7/2009 | Huetter | G06F 17/30551 |
| 2009/0299969 A1* | 12/2009 | Le | G06F 17/30551 |
| 2009/0307277 A1* | 12/2009 | Grubov | G06F 11/1451 |
| 2009/0319486 A1* | 12/2009 | Surlaker | G06F 17/30551 |
| 2010/0036843 A1* | 2/2010 | MacNaughton | G06F 17/30362 707/649 |
| 2010/0106695 A1* | 4/2010 | Calder | G06F 17/30501 707/696 |
| 2010/0241614 A1* | 9/2010 | Shaull | G06F 17/30368 707/649 |
| 2011/0282860 A1* | 11/2011 | Baarman et al. | 707/709 |
| 2012/0030258 A1* | 2/2012 | Jain | G06F 17/30309 707/812 |
| 2012/0060072 A1 | 3/2012 | Simitci et al. | |
| 2012/0284233 A1* | 11/2012 | Otani | G06F 17/30088 707/649 |
| 2013/0066866 A1* | 3/2013 | Chan | G06F 17/30551 707/732 |
| 2013/0080393 A1* | 3/2013 | Bird | G06F 17/30551 707/649 |
| 2013/0124476 A1 | 5/2013 | Zhong et al. | |
| 2013/0132346 A1* | 5/2013 | Varadarajan | G06F 11/1448 707/639 |
| 2013/0218840 A1* | 8/2013 | Smith | G06F 11/1446 707/639 |

OTHER PUBLICATIONS

Judd, D., "Hypertable: The Storage Infrastructure behind Rediffmail—one of the World's Largest Email Services", 2012, 8 pages, accessed online at <https://2012.nosql-matters.org/cgn/wp-content/uploads/2012/06/D-Judd-Hypertable-Talk.pdf> on Mar. 17, 2016.*

HYPERTABLE, Inc., "Hypertable Architecture Overview", White Paper, Mar. 2012, 8 pages, accessed online at <http://www.hypertable.com/collateral/whitepaper-hypertable-architecture.pdf> on Mar. 17, 2016.*

Judd, D., "Scale Out with Hypertable", in Linux Magazine, Aug. 7, 2008, 5 pages, accessed online at <http://www.linux-mag.com/id/6645/> on Mar. 17, 2016.*

Khetrapal et al., "HBase and Hypertable for Large Scale Distributed Storage Systems—A Performance Evaluation for Open Source BigTable Implementations", 2008, 8 pages, accessed online at <http://cloud.pubs.dbs.uni-leipzig.de/sites/cloud.pubs.dbs.uni-leipzig.de/files/Khetrapal2008HBaseandHypertableforlarge-scaledistributedstorage.pdf> on Mar. 17, 2016.*

Silva et al., "An Incremental Batch-Oriented Index for Bitemporal Databases", IEEE, 2000, 9 pages, accessed online at <http://ieeexplore.ieee.org/stamp/stamp.jsp?tp=&arnumber=856594> on Mar. 17, 2016.*

Zhou, Wenchao et al., "Efficient Querying and Maintenance of Network Provenance at Internet-Scale", SIGMODY 1—, Jun. 6-11, 2010, Indianapolis, IN.

Hossain, Sohrab et al. "A Critical Comparison Between Distributed Database Approach and Data Warehousing Approach", ISJER (www.ijser.org) Jan. 1, 2014.

"Comparison between centralized and distributed DBMS", http://www.ukessays.co.uk/essays/information-technology/comparison-between-centralized-and-distributed-dbms.php Jan. 1, 1901.

"Distributed database" http://en.wikipedia.org/wiki/Distributed_database Jan. 1, 1901.

Change, Fay et al. "Bigtable: A Distriuted Storage System for Structured Data", Google., http://static.googleusercontent.com/media/research.google.com/en/us/archive/bigtable-osdi06.pdf Aug. 30, 2006.

"Big Table" http://en.wikipedia.org/wiki/BigTable Jan. 1, 1901.

"HBase vs. BigTable Comparison" http://www.larsgeorge.com/2009/11/hbase-vs-bigtable-comparison.html Nov. 24, 2009.

Lakshman, Avinash et al., "Cassandra—A Decentralized Structured Storage System", http://www.cs.cornell.edu/projects/ladis2009/papers/lakshman-ladis2009.pdf Dec. 31, 2009.

Ellis, Jonathan, "Facebook's Cassandra paper, annotated and compared to Apache Cassandra 2.0", http://docs.datastax.com/en/articles/cassandra/cassandrathenandnow.html Jan. 1, 1901.

Yang, Fanglin, et al. "Druid: A Real-time Analytical Data Store" Jan. 1, 1901.

Lamport, Leslie. "Paxos Made Simple", http://research.microsoft.com/en-us/um/people/lamport/pubs/paxos-simple.pdf Nov. 1, 2001.

"Druid (open-source data store)", http://en.wikipedia.org/wiki/Druid_%28open-source_data_store%29 Jan. 1, 1901.

"Druid (open-source data store)", http://en.wikipedia.org/wiki/Druid_%28open-source_data_store%29 Feb. 6, 2014.

"Distributed database" http://en.wikipedia.org/wiki/Distributed_database Sep. 13, 2011.

"Big Table" http://en.wikipedia.org/wiki/BigTable Sep. 8, 2011.

Zhou, Wenchao et al., "Efficient Querying and Maintence of Network Provences at Internet Scale," Sigmody 1, Jun. 6-11, 2010, Indianoplis, IN Jun. 6, 2010.

* cited by examiner

SYSTEM AND METHOD FOR STORING STREAM DATA IN DISTRIBUTED RELATIONAL TABLES WITH DATA PROVENANCE

This non-provisional patent application claims priority to, and incorporates herein by reference, U.S. Provisional Patent Application No. 61/538,446 which was filed Sep. 23, 2011.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The presently disclosed invention relates in general to the field of storing data in a distributed relational stream table, and in particular to a system and method for storing data streams, tracking the provenance of the stored data as the data is updated or modified, and querying for data as stored at various points in time.

BACKGROUND OF THE INVENTION

Systems for storing data in relational structures are known in the art. Such systems are disclosed in the following: E. F. Codd, *The Relational Model for Database Management, Version* 2, Addison Wesley, May 2000; ISO/IEC standards documents 9075(1-4, 9-11, 13, 14); K. Arnold, J. Gosling, D. Holmes, *The Java Programming Language*, $5^{th}$ ed., Prentice Hall, March 2012; L. Andersen, *JDBC 4.0 Specification*, Sun Microsystems, November 2006. Each of these publications is hereby incorporated by reference in their entirety. Temporal database management is also known in the art, as discussed in C. J. Date, *Temporal data and the Relational Model*, Morgan Kaufman Publishers, December 2002, which is hereby incorporated by reference. While such systems may be suited to storing the value of data sets at a given point in time, these systems fail to provide for efficient storage and querying of data provenance information, or for doing so in a distributed environment. The presently disclosed invention addresses such limitations by providing a system and method for efficiently storing and querying data provenance information, as well as being highly distributable.

SUMMARY OF THE INVENTION

The presently disclosed invention may be embodied in various forms, including a system, a method or computer readable medium for storing, tracking and querying data along with its provenance. Such an embodiment for a system may comprise a table-store adapted to store data-blocks. The table-store may comprise data-elements allocated to the data-blocks. The table-store may be located on a distributed device. The data-elements may be represented in a hyper-table. The hyper-table may comprise: (i) hyper-rows, which may represent the data-elements allocated to the data-blocks; (ii) one or more hyper-columns, which may be associated with attributes of the data-elements; and (iii) hyper-cells, which may store data-values of the data-elements.

The system may further comprise indices of the hyper-rows and the at least one hyper-columns for the data-elements. The data-values of the data-elements in the hyper-cells may be retrieved based on the indices. In certain embodiments, the indices may be stored in the table-store. The system may comprise snapshots of the indices at pre-determined time-periods. The snapshots may be generated at the pre-determined time-periods. A snapshot may comprise the indices as the indices existed at the pre-determined time-period. The indices may be capable of being re-generated as the indices existed at the pre-determined time-period.

The system may further comprise checkpoints of the hyper-table as the hyper-table existed on the table-store at various time-periods. The time-periods may be based on transactions on the hyper-table. The checkpoints may be adapted to track deltas in the transactions. The hyper-table may be capable of being queried as the hyper-table existed at those time-periods, e.g. immediately prior to the transactions. A query for the data-elements, which are represented in the hyper-table, may be executed based in part on selected time-periods in order to retrieve the data-values of data-elements as the data-elements existed at the selected time-periods.

Similarly, an embodiment of a method for storing data may comprise the step of representing data-elements in a hyper-table stored in a table-store. The data-elements may be allocated to data-blocks that are stored in the table-store. The table-store may be located on a distributed device. The hyper-table may comprise: (i) hyper-rows, which may represent the data-elements allocated to the data-blocks; (ii) one or more hyper-columns, which may be associated with attributes of the data-elements; and (iii) hyper-cells, which may store data-values of the data-elements. The method may further comprise generating indices of the hyper-rows and the hyper-columns for the data-elements. The data-values of the data-elements in the hyper-cells may be capable of being retrieved based on the indices. In certain embodiments, the indices may be stored in the table-store.

The method may comprise generating snapshots of the indices at pre-determined time-periods. The snapshot may comprise the indices as the indices existed at the pre-determined time-period. The indices may be capable of being re-generated as the indices existed at the pre-determined time-period. The method may further comprise generating checkpoints of the hyper-table at time-periods. The time-periods may be based on transactions on the hyper-table. The checkpoints may be adapted to track deltas in the transactions. The hyper-table may be capable of being queried as the hyper-table existed at the time-periods.

Likewise, an embodiment of a computer readable medium for the present invention is disclosed. The computer readable medium may comprise computer readable instructions stored thereon for execution by a processor. The instructions on the computer-usable medium may be adapted to represent data-elements in a hyper-table stored in a table-store. The data-elements may be allocated to data-blocks stored in the table-store. The table-store may be located on a distributed device. The hyper-table may comprise: (i) hyper-rows, which may represent the data-elements allocated to the data-blocks; (ii) one or more hyper-columns, which may be associated with attributes of the data-elements; and (iii) hyper-cells, which may have data-values of the data-elements.

The instructions on the computer-usable medium may be further adapted to generate indices of the hyper-rows and the hyper-columns for the data-elements. The data-values of the data-elements in the hyper-cells may be capable of being retrieved based on the indices. In addition, snapshots of the indices may be generated at pre-determined time-periods. The snapshot may comprise the indices as the indices existed at the pre-determined time-period. Further, checkpoints of the hyper-table may be generated at time-periods. The time-periods may be based on transactions on the hyper-table. The checkpoints may be adapted to track deltas in the transactions. The hyper-table may be capable of being queried as the hyper-table existed at the time-periods.

In embodiments of the above-disclosed computer readable medium, method and system, a query for the data-elements represented in the hyper-table may be executed based in part on selected time-periods. In addition, the data-values of data-elements may be retrieved as the data-elements existed at the selected time-periods based on results from the executed query.

In these disclosed embodiments, the data-values of the data-elements may be described by the attributes of the corresponding data-elements. Each of the attributes of the corresponding data-elements may comprise a data-name and a data-type for the corresponding data-elements.

In certain embodiments, block-identifiers may be assigned to the data-blocks. In addition, the data-blocks may comprise binary large objects. Each binary large object may be associated with an unique address. The unique address may be based on content of the binary large object. The assigned block-identifiers may be based on the corresponding unique addresses.

In some embodiments, a transaction may be performed on the hyper-table. A binary large object may be generated corresponding to the transaction. A checkpoint of the hyper-table may be generated. The checkpoint may track a delta that corresponds to the binary large object. The time of the transaction may be recorded. In certain embodiments, the transaction may be a hyper-row insertion, a hyper-row deletion, or a hyper-row modification.

In an embodiment, the hyper-table may comprise a plurality of distributed hyper-tables. A transaction may be performed on only one of the distributed hyper-tables. The referential integrity of that distributed hyper-tables may be maintained. In certain embodiments, the transaction may correspond to a hyper-row in the hyper-table. The generated binary large object corresponding to the transaction may comprise the data-value of the data-element represented by the hyper-row. The data-value may comprise changed-values and unchanged-values. The changed-values may be based on the transaction.

In an embodiment, each checkpoint for each distributed hyper-tables may be sequentially numbered. The checkpoints may be ordered for each one of distributed hyper-tables. The sequential numbering of each checkpoint may be generated so that conflicts are prevented.

In an embodiment, recovered-indices may be based on the most-recent snapshots. The most-recent snapshots may comprise the indices that were most-recently generated, e.g. at a recent time-period. The recovered-indices may be generated for recovery purposes after a system-failure. The recovered-indices may be loaded, and post-snapshot checkpoints may be applied to the recovered-indices. The post-snap checkpoints may be the checkpoints generated at time-periods subsequent to the recent time-period. The recovered-indices may be modified based on the post-snapshot checkpoints.

In certain embodiments, a query for the data-elements represented in the hyper-table may be executed based on a checkpoint, and a result set of hyper-rows may be generated based on the query. Subsequent-checkpoints may be applied to the result set of hyper-rows. The subsequent-checkpoints may be the checkpoints generated at the time-periods subsequent to the time-period of the checkpoint. The result set of hyper-rows may be modified based on the subsequent-checkpoints.

In certain embodiments, a query for the data-elements represented in the hyper-table may be executed based on a snapshot of the indices, and a result set of hyper-rows may be generated based on the query. Subsequent-checkpoints may be applied to the result set of hyper-rows. The subsequent-checkpoints may be applied to the checkpoints generated at the time-periods subsequent to the pre-determined time-period of the snapshot. The result set of hyper-rows may be modified based on the subsequent-checkpoints.

In certain embodiments, a query for the data-elements represented in the hyper-table may be executed based on a snapshot of the indices. The pre-determined time-period of the snapshot may be subsequent to a time-period of a checkpoint. A result set of hyper-rows may be generated based on the query. Prior-checkpoints may be applied to the result set of hyper-rows. The prior-checkpoints may be the checkpoints generated at the time-periods prior to the pre-determined time-period of the snapshot and subsequent to the time-period of the checkpoint. The result set of hyper-rows may be modified based on the prior-checkpoints. The modified result set of hyper-rows may represent the data-elements as the data-elements existed at the time-period of the checkpoint.

In an embodiment, two or more hyper-tables may be logically joined based on predetermined rules. The predetermined rules may comprise join-operations. Join-views may be generated based on the joined hyper-tables, and the join-views may be indexed. The join-views may comprise hyper-tables. Each of the join-views may have hyper-rows representing the data-elements.

In an embodiment, a join-operation may be performed on two or more hyper-tables. The two or more hyper-tables may be hyper-tables or join-views. The join-views may be hyper-tables based on two or more hyper-tables that are logically joined. The result set of hyper-rows may be stored based on the performed join-operation. The stored result set may be stored as a checkpoint in a joining hyper-table. In certain embodiments, a checkpoint in the joining hyper-table may be generated only when identifying a delta in the joining hyper-table identified based on a transaction on the hyper-table.

In an embodiment, consecutive-checkpoints may be retrieved. The consecutive-checkpoints may be a consecutive subset of the checkpoints. The tracked deltas of the consecutive-checkpoints may be cumulatively applied to a result set of hyper-rows. The result set of hyper-rows may be generated from the query for the data-elements represented in the hyper-table based on a snapshot of the indices.

In some embodiments, the hyper-table may maintain a set of listeners. The listeners may be notified upon generation of a checkpoint for the hyper-table.

In certain embodiments, the table-store may comprise distributed table-stores located on distributed devices. The distributed devices may be connected via a network. A data-block may be is stored on a first distributed device, and an index may be stored on a second distributed device. In some embodiments, the first distributed device is the second distributed device. In some embodiments, the first distributed device and the second distributed device are not the same device.

In an embodiment, a current data-value for a data-element may be determined and a historic data-value for the data-element may be determined. The current data-value and the historic data-value may be compared. Comparisons may be generated based on the current data-value and the historic data-value. The comparisons may indicate value-changes of the data-element for a time-period.

In some embodiments, the hyper-table may have a schema. The schema may comprise a data-name and a data-type for the data-elements represented in the hyper-table. In certain embodiments, the table-store may be a distributed file system. The hyper-table may comprise a physical data structure and a logical structure. The indices may be stored in the logical structure. An index may comprise a metric tree logical structure. In some embodiments, a data-element may be received via data-streams from distributed devices connected by a network.

BRIEF DESCRIPTION OF THE DRAWINGS

The foregoing and other objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE EMBODIMENTS

Reference will now be made in detail to the embodiments of the presently disclosed invention, examples of which are illustrated in the accompanying drawings.

One of the objects of the present system and method may be providing transactional data storage and querying that may adapted to operate in a highly distributed environment and also efficiently tracks data provenance information. The object for certain embodiments may concern tracking stored data through transactions, transformations and usage. The present system and method may allow for storage of arbitrary data sets in a transactional system, and querying of the stored data in a manner substantially similar to traditional query languages such as SQL. The embodiments of the present system and method may allow for joining tables containing related data sets and selectively retrieving data from the joined tables. An object of these embodiments may be querying of data as it existed at predetermined times in the past. In this way, the system and method of the present invention may be capable of storing data with provenance, thereby allowing for the determination of the current data-values as well as a history indicating how those values have changed over time.

Certain systems and methods for storing and querying files and data streams in distributed computing environments are described in patent applications filed by the present inventors, including U.S. patent application Ser. No. 13/600,853 which was filed Aug. 31, 2012 and U.S. patent application Ser. No. 13/479,684 which was filed May 24, 2012. Both of these patent applications are incorporated herein by reference.

Figure 1:
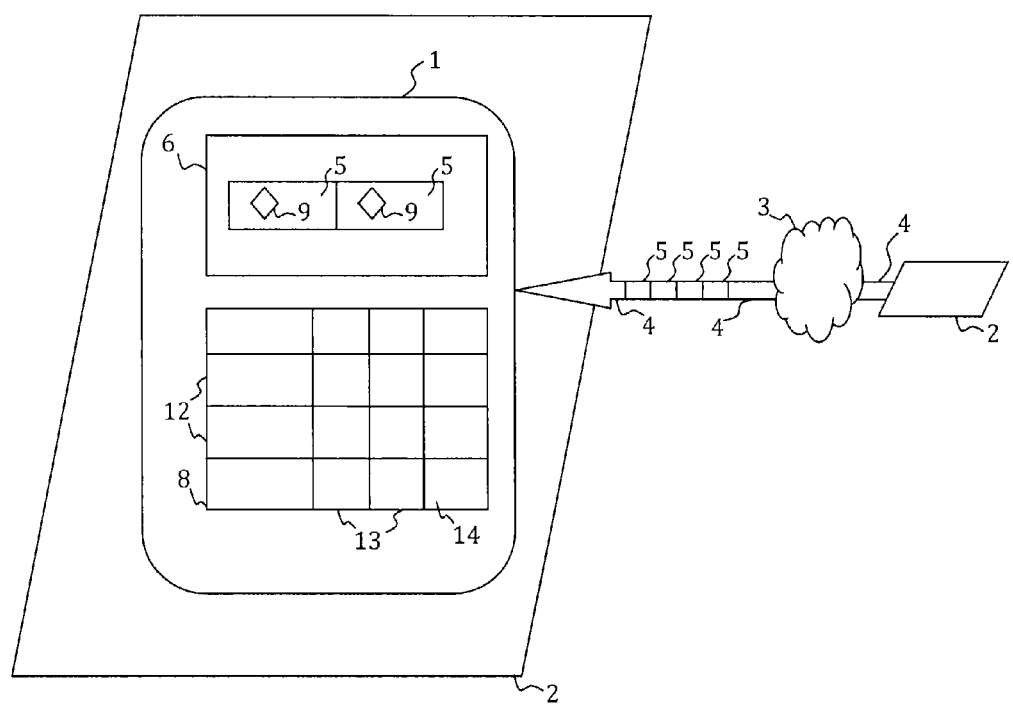
FIG. 1 is a diagram illustrating an embodiment of a data storing system, in accordance with certain embodiments of the invention.

In an embodiment of the system and method of the present invention, data may be divided and stored in table stores 1, such as hyper-table stores 1, for efficient query. As illustrated in FIG. 1, such an embodiment may comprise table stores 1 stored in distributed devices 2. The distributed devices 2 may be adapted to communicate via a network 3. In certain embodiments, data-streams 4 may be received from the distributed devices 2. Each of the data-streams 4 may comprise data-elements 5, which may be transmitted via the network 3.

The table stores 1 may store the data-elements 5 of the received data-streams 4. Such stored data-elements 5 (not shown) may comprise digital copies of the transmitted data-elements 5. A table store 1, which receives and stores data-elements 5 from a distributed device 2, may be located on another distributed device 2, as illustrated in FIG. 1. In some embodiments, data-elements 5 may be stored in table stores 1 without having been transmitted via data-streams 4. Such data-elements 5 may be generated, entered, or copied in whole or in batches. In an embodiment, the distributed devices 2 may store data-files (not shown) comprising data-elements 5. The data-files may comprise native files, and the data-elements 5 may comprise data bytes.

The stored data-elements 5 may be allocated to data-blocks 6 of a table store 1. An allocation of the data-elements 5 may comprise a representation of the stored data-elements 5. Such a data-element allocation may comprise an association with the stored data-elements 5, as opposed to a copy or the actual instance of the allocated data-elements 5. The stored data-elements 5, or their allocations, may be logically grouped. Each of the table stores 1 may comprise one or more data-blocks 6. Further, each data-block 6 may comprise the stored data-elements 5, or the allocations of such stored data-elements 5, received from only one of the data-streams 4. Data-blocks 6, which store the data-elements 5 of a single data-stream 4, may be logically grouped. In addition, each one of the data-blocks 6 may be read and written as a single unit.

In certain embodiments, the stored data-elements 5 may be allocated to data-blocks 6 based on a Kademlia algorithm. In an embodiment, each data-block 6 may comprise a binary large object (blob), or may be represented by a binary large object. The binary large objects may have a maximum predetermined size. The binary large objects may have different file sizes.

In an embodiment, a block-identifier 7 (not shown) may be assigned to, or associated with, each of the data-blocks 6. Each of the key or block-identifiers 7 may be globally unique. A block-identifier 7 may be an unique address for the corresponding allocated data-elements 5 of the corresponding data-block 6. The block-identifier 7 may be generated based on the allocated data-elements 5 of the corresponding data-block 6, such as attributes or content of the allocated data-elements 5. The block-identifiers 7 may comprise hash values. Data tables 8 may store the block-identifiers 7, or representations thereof. Such distributed data tables 8 may comprise distributed hash tables that are stored on the distributed devices 2.

In some embodiments, token-names 9 may be assigned to each of the allocated data-elements 5 or data-element allocations. Each of the allocated data-elements 5 may have a token-name 9. The token-names 9 may be human-readable names.

In an embodiment, a table store 1 may logically store a set of multi-dimensional data tables 8, such as hyper-tables 8. Each data table 8 may have its own schema 10. The table store 1 may be adapted to store data-elements 4 referenced in the data tables 8 in a transactionally controlled manner. As a result, referential integrity may be promoted among the data-elements 4 stored, and also to track changes to the data-elements 4 listed in the data tables 8 in a manner that allows efficient querying against the data tables 8 as the data-elements 4 existed at any checkpoint 11 (not shown) in their respective histories. In an embodiment, a checkpoint 11 may be a copy or representation of the hyper-tables 8 as stored on a distributed file system or table stores 1 at a point in time. In certain embodiments, table stores 1 may be, at a low level, files stored in a file system on a server connected to a data network 3. Such file systems may reside on the distributed devices 2, as shown in FIG. 1. Examples of certain distributed file systems are described in other patent applications filed by the present inventors, including U.S. patent application Ser. No. 13/600,853 which was filed Aug. 31, 2012 and U.S. patent application Ser. No. 13/479,684 which was filed May 24, 2012.

In an embodiment, hyper-tables 8 may comprise a logical structure, which may represent the appearance of the table from the perspective of data queries, and a physical structure, which may represent the physical storage of the table data in the file system or table stores 1. With respect to the logical structure, each table 8 may be logically laid out as a multi-dimensional hyper-cubic grid. The table schema 10 may indicate the name and data-type of each data-element 4 stored or represented in a given hyper-row 12 of the grid of the table 8. Each hyper-row 12 of the grid may represent one physical entity, such as one data record or data-element 4, and may be analogous to a row in a table in standard SQL database. Each hyper-column 13 may be associated with a name and a data-type, as specified in a table schema 10. A hyper-cell 14 in the grid may be a position where a hyper-row 12 and a hyper-column 13 intersect. Each hyper-cell 14 in the grid may contain a data-value (not shown) that may be specific to the entity or data-element 4 represented by the hyper-row 12 and that may be described by the name and data-type specific to the hyper-column 13.

Indices 15 (not shown) may be included the logical structure in order to improve the efficiency of queries. Indices 15 are known in the art, and are further described in the incorporated references. Hyper-rows 12 and hyper-columns 13 may be indexed by indices 15, each of which may be optimized for quickly locating and retrieving hyper-rows 12, hyper-columns 13, hyper-cells 14 and data-values. An appropriate index structure may be mapped to the logical structure, such as metric trees. By incorporating indices 15 in the logical structure, it becomes possible to allow for selecting those indices 15 and index-types that are believed to provide the greatest overall performance gain as the table store 1 is accessed in a production environment.

In an embodiment, each entity or data-element 5 or data-block 6, or each representation or allocation thereof, may be stored as a binary large object (blob) in the distributed file system or table stores 1. An entity's physical address in the blob namespace may be a Secure Hash Algorithm (SHA) hash of the content of a binary large object. In an embodiment, a block-identifier 7 may be based on the content of a binary large object or the data-block 6. Because blobs or entities with different contents will have different hash values, the structure may have the advantage of automatically causing identical entities to be stored as a single physical entity, thereby resulting in automatic de-duplication.

Changes to a table 8 (such as insertions, removals, and modifications of logical rows) may occur in transactions, in accordance with certain embodiments. All changes included in a transaction may take effect simultaneously and atomically on a hyper-table 8, thereby helping ensure that the database remains in a consistent state (i.e. maintains referential integrity) by requiring that each insertion, deletion, or modification succeeds or fails in its entirety. With regard to a hyper-row 12 in a hyper-table 8, a transaction may comprise a hyper-row insertion, a hyper-row deletion, or a hyper-row modification. In certain embodiments, transactions may be performed on a single hyper-table 8 and may not span multiple tables 8. In such embodiments, the term "referential integrity" may be used to refer to integrity of data-values within a single table 8 and not the integrity of data-values across multiple tables 8.

In an embodiment, each completed transaction on a table 8 may trigger the generation of a new checkpoint 11 for that table 8. Accordingly, such a checkpoint 11 may be a copy or representation of the hyper-tables 8 as stored in a table store 1 at points in time based on transactions on the hyper-tables 8. Each checkpoint 11 may be recorded in a file in a distributed file system or table store 1. Each checkpoint file may record the changes or deltas 16 (not shown) that occurred in the transaction that caused the checkpoint 11 to be created. In an embodiment, a delta 16 would correspond to a new blob file being written for a given entity or data-element 5 represented in a hyper-row 12. In other words, changing a logical row may require storing a new physical row that contains all of the data-values in the logical row, including both the data-values that changed and the data-values that remained the same. In an embodiment, the data-values may comprise the changed and unchanged values for a corresponding data-element 5, as the values existed before and after the transaction occurred. Accordingly, blobs or data-elements 5 may be immutable and deltas 16 may be tracked at the table level and not at the entity or hyper-row level. In certain embodiments, binary large objects may be generated based on tracked deltas, so as to correspond to a transaction, and may be stored on a distributed storage device.

The checkpoints 11 may be adapted to track deltas 16 in the transactions. The checkpoints 11 may be sequentially numbered for each table so that there is a global ordering over all checkpoints 11 for each table 8. Either forward deltas 16 or reverse deltas 16 can be used. Conflicting concurrent changes to a table 8 may be prevented because only one writer can create the checkpoint file having the next number in the sequence, which is enforced by consensus. Methods of enforcing consensus so that numbers are not reused are understood in the art. A variety of graph structures may be additionally used for storing the evolution information.

In certain embodiments, indices 15 may be held in random access memory (RAM) for fast access. Indices 15 may be periodically persisted to disk in the form of snapshots 17 (not shown). In an embodiment, the snapshots 17 of the indices 15 may be stored in Read Only Memory (ROM). A snapshot 17 may comprise a copy or representation of an index 15 at pre-determined time-periods, in accordance with certain embodiments. These snapshots 17 may allow the in-memory index 15 to be rebuilt in the event of a crash without the need to replay or regenerate the entire sequence of checkpoints 11 from the beginning. Instead, following a crash and recovery, the most recent snapshot 17 may be loaded into memory, and then any checkpoints 11 created after the snapshot 17 may be applied to the in-memory index 15.

The time-period between snapshots 17 may be increased as the index 15 increases, so as to conserve storage capacity. Longer gaps in the provenance information for the data-elements 5 may result.

In an embodiment, the checkpoints 11 and the snapshots 17 may be utilized to perform historical queries of the data-table 8 as it existed during the time-period between any two consecutive checkpoints 11. If a query references a recent enough checkpoint 11, then the current, "live" index 15 stored in RAM may be consulted to find the hyper-rows 12 presently satisfying the query. The result set may be modified by reverse application of the checkpoints 11 between the most recent snapshot 17 and the checkpoint 11 being queried. Alternately, if the checkpoint 11 being queried is older, it may be more efficient to consult an older snapshot 17 of the index 15 to construct an approximate result set, and then modify the result set by walking forward or backward through the sequence of checkpoints 11 to reach the queried checkpoint 11.

In certain embodiments, a table store 1 may support join-views, which are data-tables 8 whose contents are solely derived by joining other data-tables 8 together according to a specified predicate. In an embodiment, join-views may be persisted and indexed in a manner similar to that for data-tables 8, except that each logical row in a join-view may be backed by more than one physical row, such as a blob in a distributed file system or table stores 1. Each entry in an index 15 on a join-view may specify multiple row addresses.

A join-view may be initialized by performing a standard join-operation on two or more data-tables 8 (which may themselves be regular tables 8 or join tables 8) and storing the result set as the first checkpoint 11 of a new table 8. From that point forward, according to certain embodiments, each new checkpoint 11 in any of the join-view's source tables 8 may cause a new checkpoint 11 to be created for the join-view if, and only if, the changes recorded in the source table's new checkpoint 11 alter the result set of the join-view. In an embodiment, hyper-tables 8 may be logically joined based on predetermined rules comprising join-operations.

In an embodiment, where the checkpoints 11 for one table 8 may not be ordered with respect to the checkpoints 11 for another table 8, there may be no guarantee on the order in which a join-view will induct new checkpoints 11 from its source tables 8, except that it will induct checkpoints 11 from each source table 8 in their proper sequence. Checkpoints 11 may be ordered sequentially, thereby conceptually forming a linear chain. Because the checkpoints 11 are persisted as files in a file system or table store 1, the chain may be randomly accessible. In ordinary use, many consecutive checkpoint files may be retrieved, and their contained deltas 16 may be cumulatively applied to a stream of row addresses being emitted from a snapshot lookup. Additionally, each table 8 may be independent of other tables 8 and each index 15 is independent of other indices 15. Accordingly, creation of a snapshot 17 on one index 15 does not require creation of a snapshot 17 on other indices 15, and creation of a checkpoint 11 on one table 8 does not require creation of a checkpoint 11 on other tables 8. In such embodiments, transactions may not span tables.

In order to support event-driven triggers, in certain embodiments, join-views and data-tables 8 may each maintain a set of listeners 18 (not shown) that will be notified upon creation of each new checkpoint 11 for that table 8. In an embodiment, a listener 18 may comprise a subroutine, such as an event handler, which may be notified upon generation of checkpoints 11 for hyper-tables 8. Internally, join-views may utilize this mechanism to respond to new checkpoints 11 on their source tables 8. The mechanism may be exposed so that other processes may react to changes in join-views and tables 8. Additionally, join-views and tables 8 may subscribe to event streams, to automatically update fields in the tables 8 at stream-time.

In an embedment, where a distributed file system or table stores 1 are used, the individual blob files and index files that correspond to a given hyper-table 8 may or may not be stored on the same physical distributed device 2. In some embodiments, the allocation of files to devices 2 may be handled at the file system level or table stores 1.

In an embodiment, a binary large object (blob) may be distributed across the participants in a grid-based file system or table stores 1. Each blob may be associated with a universally unique address. The unique address may be determined to retrieve the contents of a blob. A physical row 12 may be an immutable instance of a data structure or data-element 5, stored as a blob. In an embodiment, the structure may be selected and defined, and may be equivalent to the table schema 10 for the table 8 of which the row 12 is a member. A table 8 may be a logical construct that contains a set of logical rows, and may not be physically stored anywhere. An index 15 may be an in-memory data structure that allows for rapid return of row addresses for rows 12 satisfying some predicate defined over some subset of a table's columns 13. A snapshot 17 may be a complete, coherent image on disk of an index 15. In an embodiment, there may be no requirement that the disk format be identical to the in-memory format. A checkpoint file or checkpoint 11 may be a file that records the row addresses of physical rows added to a table 8 and physical rows 12 removed from a table 8 in a single transaction.

In an embodiment, a system for storing data across storage devices 2 attached to a common network 3 may comprise processors operably connected to the storage devices 2 and adapted to communicate across the common network 3. The processors may be adapted to implement a distributed table store 1 comprising blobs for each entity or data-element 5 stored in a distributed file system or table store 1. The distributed table store 1 may further comprise one or more indices 15 and one or more checkpoints 11. Data may be stored across a distributed group of storage devices 2 and queries may be executed across multiple time periods corresponding to said checkpoints 11.

Figure 2:
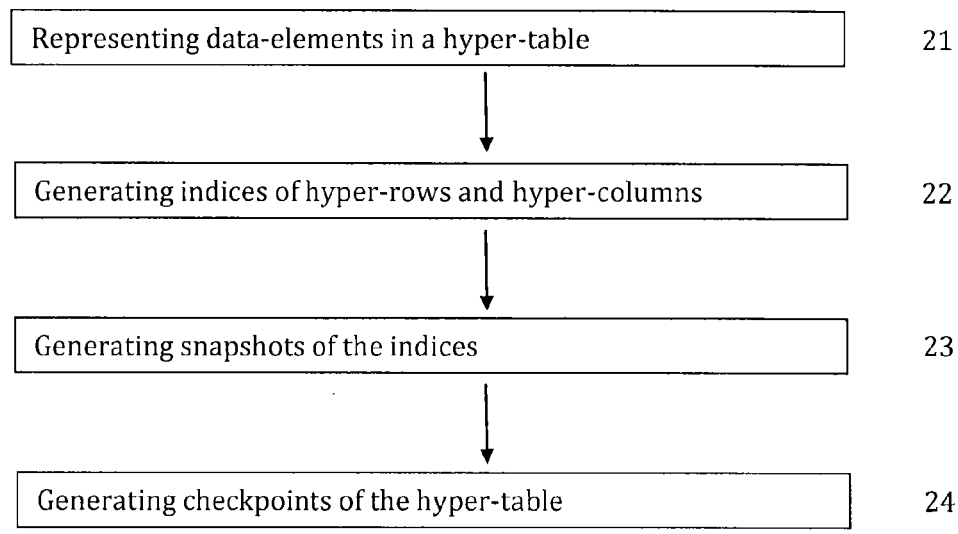
FIG. 2 is a flowchart illustrating an embodiment of a data storing method, in accordance with certain embodiments of the invention.
Figure 3:
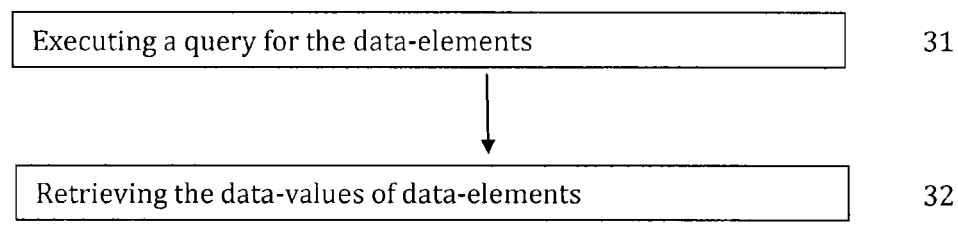
FIG. 3 is a flowchart illustrating certain steps of an embodiment of a data storing method, in accordance with certain embodiments of the invention.

FIG. 2 is a flowchart illustrating steps in an embodiment of a data storing method. As shown, a method may comprise the steps of representing 21 data-elements in a hyper-table and generating 22 indices of hyper-rows and hyper-columns of the hyper-table. The method may further comprise generating 23 snapshots of the indices at pre-determined time-periods and generating 24 checkpoints of the hyper-table at time-periods based on transactions on the hyper-table. In certain embodiments, as shown in FIG. 3, the method may also comprise executing 31 a query for the data-elements represented in the hyper-table and retrieving 32 the data-values of data-elements as the data-elements existed at the selected time-periods.

Figure 4:
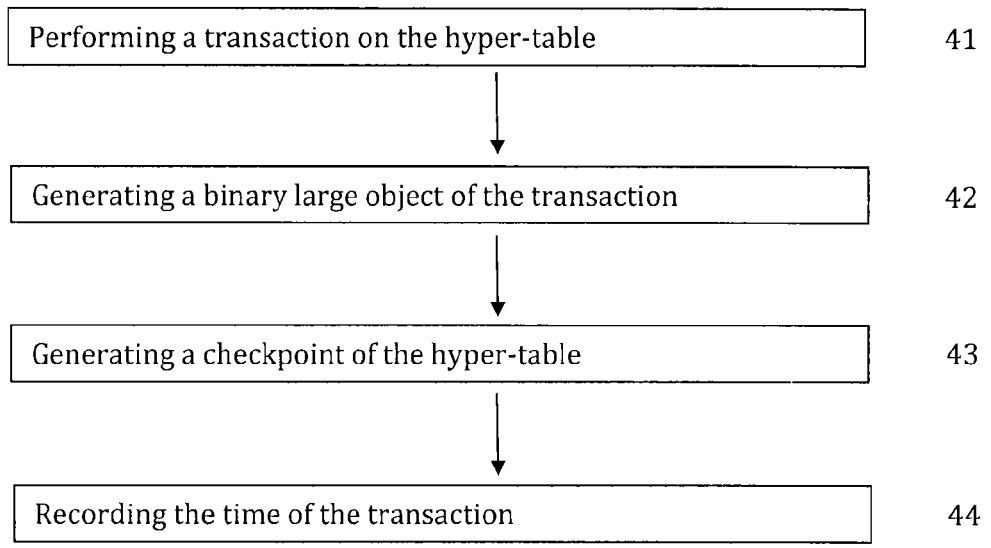
FIG. 4 is a flowchart illustrating certain steps of an embodiment of a data storing method, in accordance with certain embodiments of the invention.

In some embodiments, the method may further comprise performing 41 a transaction on the hyper-table and generating 42 a binary large object corresponding to the transaction, as shown in FIG. 4. The method may comprise generating 43 a checkpoint of the hyper-table, wherein the checkpoint tracks a delta that corresponds to the binary large object, and recording 44 the time of the transaction.

Figure 5:
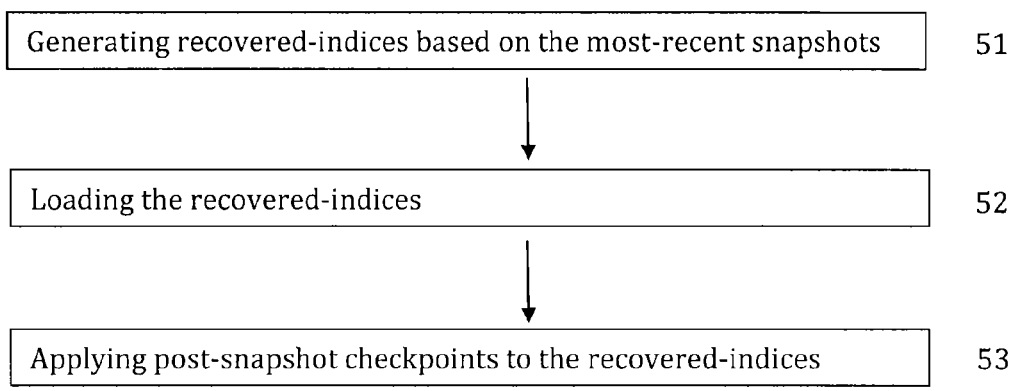
FIG. 5 is a flowchart illustrating certain steps of an embodiment of a data storing method, in accordance with certain embodiments of the invention.
Figure 6:
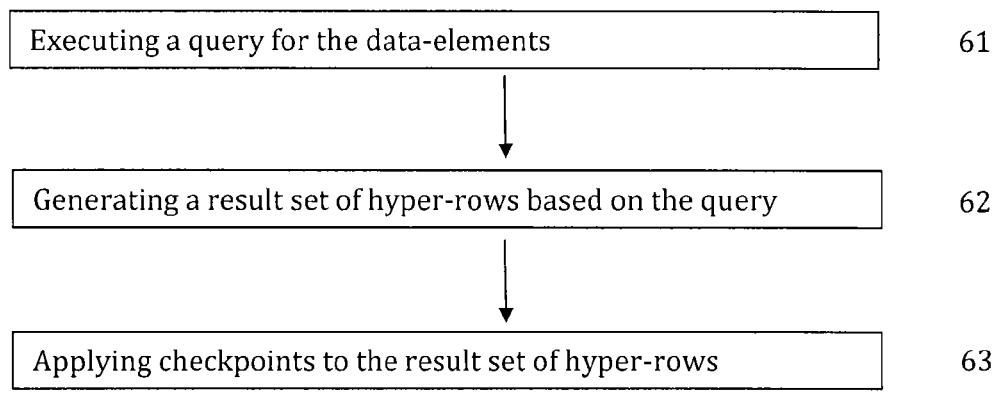
FIG. 6 is a flowchart illustrating certain steps of an embodiment of a data storing method, in accordance with certain embodiments of the invention.
Figure 7:
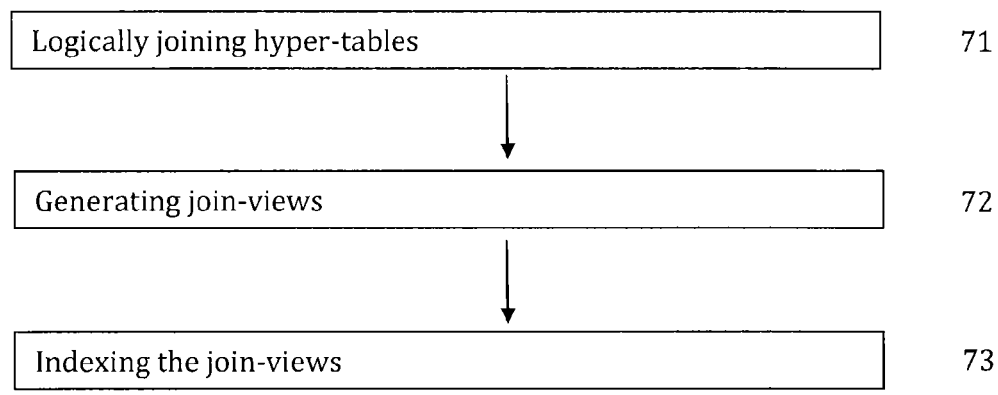
FIG. 7 is a flowchart illustrating certain steps of an embodiment of a data storing method, in accordance with certain embodiments of the invention.

FIG. 5 illustrates additional steps of the method, including the steps of generating 51 recovered-indices based on the most-recent snapshots, loading 52 the recovered-indices, and applying 53 post-snapshot checkpoints to the recovered-indices. With regard to the embodiment shown in FIG. 6, the method also comprises executing 61 a query for the data-elements represented in the hyper-table. The query may be based on a checkpoint of the hyper-tables or a snapshot of the indices. Further, the method may comprise generating 62 a result set of hyper-rows based on the query, and applying 63 checkpoints to the result set of hyper-rows. These checkpoints may comprise subsequent-checkpoints, which may be checkpoints generated subsequent to the checkpoint or the snapshot. These checkpoints may comprise prior-checkpoints, which may be checkpoints generated prior to the snapshots and subsequent to the checkpoint. In certain embodiments, as shown in FIG. 7, the method further comprises logically joining 71 hyper-tables, generating 72 join-views, and indexing 73 the join-views.

Although some of the drawings illustrate a number of operations in a particular order, operations which are not order-dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The term "adapted" when used in this application shall mean programmed, configured, adjusted, dimensioned, oriented and arranged as appropriate to the purpose or function described, using methods and procedures known to those of ordinary skill in the art. Other terms used herein shall have the meanings commonly understood by software engineers skilled in the development of distributed database systems, including those developed in the Java language, in light of the definitions and explanations set forth in the incorporated references, and further in light of the context in which such terms are used herein.

While the invention has been particularly shown and described with reference to an embodiment thereof, it will be understood by those skilled in the art that various changes in form and details may be made therein without departing from the spirit and scope of the invention.

What is claimed is:

1. A method for storing and querying data, comprising the steps of:
    representing data-elements in a hyper-table stored in a table-store, wherein the data-elements are allocated to data-blocks stored in the table-store, wherein the table-store is located on a distributed device, wherein the hyper-table comprises: (i) hyper-rows representing the data-elements allocated to the data-blocks, (ii) at least one hyper-column associated with an attribute of the corresponding data-elements, and (iii) hyper-cells having data-values of the corresponding data-elements;
    generating indices of the hyper-rows and the at least one hyper-column for the corresponding data-elements, wherein the indices are located on the distributed device and the data-values of the corresponding data-elements in the hyper-cells are capable of being retrieved based on the indices;
    storing a pre-determined time period on the distributed device;
    generating snapshots of the indices at each occurrence of the pre-determined time-period, wherein the snapshots comprise the indices as the indices existed at the occurrence of the pre-determined time-period;
    generating checkpoints of the hyper-table at each occurrence of the pre-determined time-period; and
    selecting one of a plurality of occurrences of the pre-determined time period and querying the snapshots of the indices and the checkpoints of the hyper-table to return query results based on the state of the indices and the hyper-table as of the selected occurrence of the pre-determined time-period,
    wherein said distributed device comprises a processor, a random-access memory, and a network interface connected to a network and is connected to a plurality of remote distributed devices, each of which comprises a processor, a random-access memory and a network interface connected to the network and is specially configured to store at least a portion of the data elements and at least a portion of the indices.

2. The method of claim 1, wherein the pre-determined time period is based on fixed time intervals.

3. The method of claim 1, wherein the pre-determined time period is based on data-values of a plurality of the data-elements in a transaction.

4. The method of claim 1, wherein each attribute of the corresponding data-elements comprises a data-name and a data-type for the corresponding data-elements.

5. The method of claim 1, further comprising the step of:
    assigning block-identifiers to the data-blocks.

6. The method of claim 5, wherein the data-blocks comprise binary large objects, wherein each binary large object is associated with an unique address, wherein the unique address is based on content of the binary large object, wherein the assigned block-identifiers are based on the corresponding unique addresses.

7. The method of claim 1, further comprising the steps of:
    performing a transaction on the hyper-table;
    generating a binary large object corresponding to the transaction;
    generating a checkpoint of the hyper-table, wherein the checkpoint tracks a delta, wherein the delta corresponds to the binary large object; and
    recording the time of the transaction.

8. The method of claim 7, wherein the transaction is selected from a group consisting of a hyper-row insertion, a hyper-row deletion, and a hyper-row modification.

9. The method of claim 7, wherein the hyper-table comprises a plurality of distributed hyper-tables, wherein the transaction is performed on only one of the plurality of distributed hyper-tables, wherein referential integrity of the only one of the plurality of distributed hyper-tables is maintained.

10. The method of claim 7, wherein the transaction corresponds to a hyper-row in the hyper-table, wherein the generated binary large object corresponding to the transaction comprises a data-value of a data-element represented by the hyper-row, wherein the data-value comprises changed-values and unchanged-values, and wherein the changed-values are based on the transaction.

11. The method of claim 1, further comprising the step of:
    sequentially numbering each checkpoint for each one of a plurality of distributed hyper-tables, wherein the checkpoints are ordered for each one of the plurality of distributed hyper-tables.

12. The method of claim 11, wherein the sequential numbering of each checkpoint is generated so that conflicts are prevented.

13. The method of claim 1, further comprising the steps of:
    generating recovered-indices based on most-recent snapshots, wherein the most-recent snapshots comprise the indices that were generated at a recent time-period, wherein the recovered-indices are generated for recovery purposes after a system-failure;
    loading the recovered-indices; and
    applying post-snapshot checkpoints to the recovered-indices, wherein the post-snapshot checkpoints are the checkpoints generated at the time-periods subsequent to the recent time-period, wherein the recovered-indices are modified based on the post-snapshot checkpoints.

14. The method of claim 1, further comprising the steps of:
executing a query for the data-elements represented in the hyper-table based on at least one of the checkpoints;
generating a result set of hyper-rows based on the query; and
applying subsequent-checkpoints to the result set of hyper-rows, wherein the subsequent-checkpoints are the checkpoints generated at the time-periods subsequent to the time-period of the at least one of the checkpoints, wherein the result set of hyper-rows are modified based on the subsequent-checkpoints.

15. The method of claim 1, further comprising the steps of:
executing a query for the data-elements represented in the hyper-table based on at least one of the snapshots of the indices;
generating a result set of hyper-rows based on the query; and
applying subsequent-checkpoints to the result set of hyper-rows, wherein the subsequent-checkpoints are the checkpoints generated at the time-periods subsequent to the pre-determined time-period of the at least one of the snapshots, wherein the result set of hyper-rows are modified based on the subsequent-checkpoints.

16. The method of claim 1, further comprising the steps of:
executing a query for the data-elements represented in the hyper-table based on at least one of the snapshots of the indices, wherein the pre-determined time-period of the at least one of the snapshots is subsequent to a time-period of at least one of the checkpoints;
generating a result set of hyper-rows based on the query; and
applying prior-checkpoints to the result set of hyper-rows, wherein the prior-checkpoints are the checkpoints generated at the time-periods prior to the pre-determined time-period of the at least one of the snapshots and subsequent to the time-period of the at least one of the checkpoints, wherein the result set of hyper-rows are modified based on the prior-checkpoints, wherein the modified result set of hyper-rows represents the data-elements as the associated data-elements existed at the time-period of the at least one of the checkpoints.

17. The method of claim 1, further comprising the steps of:
logically joining at least two of a plurality of hyper-tables based on predetermined rules, wherein the predetermined rules comprise join-operations;
generating join-views based on the joined at least two of the plurality of hyper-tables; and
indexing the join-views, wherein the join-views are hyper-tables, wherein each of the join-views has hyper-rows representing the data-elements.

18. The method of claim 17, further comprising the steps of:
performing a join-operation on two or more hyper-tables, wherein the two or more hyper-tables are selected from a group consisting of the plurality of hyper-tables and the join-views, wherein the join-views are hyper-tables based on at least two of the plurality of hyper-tables that are logically joined; and
storing a result set of hyper-rows based on the performed join-operation, wherein the stored result set is stored as a checkpoint in a joining hyper-table.

19. The method of claim 18, further comprising the step of:
generating a checkpoint in the joining hyper-table only when identifying a delta in the joining hyper-table identified based on a transaction on the hyper-table.

20. The method of claim 1, further comprising the steps of:
retrieving a plurality of consecutive-checkpoints, wherein the consecutive-checkpoints are a consecutive subset of the checkpoints, wherein each checkpoint tracks a delta; and
cumulatively applying the tracked deltas of the plurality of consecutive-checkpoints to a result set of hyper-rows, the result set of hyper-rows generated from the query for the data-elements represented in the hyper-table based on at least one of the snapshots of the indices.

21. The method of claim 1, wherein the hyper-table maintain a set of listeners, wherein the listeners are notified upon generation of a checkpoint for the hyper-table.

22. The method of claim 1, wherein the table-store comprises a plurality of distributed table-stores located on a plurality of distributed devices, wherein the plurality of distributed devices are connected via a network, wherein at least one of the data-blocks is stored on a first distributed device, and wherein at least one of the indices is stored on a second distributed device.

23. The method of claim 22, wherein the first distributed device is the second distributed device.

24. The method of claim 22, wherein the first distributed device and the second distributed device are different devices.

25. The method of claim 1, further comprising the steps of:
determining a current data-value for at least one data-element;
determining a historic data-value for the at least one data-element;
comparing the current data-value and the historic data-value; and
generating comparisons based on the current data-value and the historic data-value, wherein the comparisons indicate value-changes of the at least one data-element for a time-period.

26. The method of claim 1, wherein the hyper-table has a schema, wherein the schema comprises a data-name and a data-type for the data-elements represented in the hyper-table.

27. The method of claim 1, wherein the table-store is a distributed file system.

28. The method of claim 1, wherein the hyper-table comprises a physical data structure and a logical structure, wherein the indices are stored in the logical structure.

29. The method of claim 1, wherein at least one of the indices comprises a metric tree logical structure.

30. The method of claim 1, wherein at least one of the data-elements is received via data-streams from a plurality of distributed devices connected by a network.

31. A system for storing data, comprising:
a distributed device, a table-store on said distributed device adapted to store data-blocks, the table-store having data-elements allocated to the data-blocks, the data-elements represented in a hyper-table, the hyper-table comprises: (i) hyper-rows representing the data-elements allocated to the data-blocks, (ii) at least one hyper-column associated with an attribute of the corresponding data-elements, and (iii) hyper-cells having data-values of the corresponding data-elements;
indices generated by said system of the hyper-rows and the at least one hyper-column for the corresponding data-elements;
a pre-determined time period stored on the distributed device;
snapshots generated by said system of the indices at each occurrence of the pre-determined time-period, the snapshots comprising the indices as the indices existed at the occurrence of the pre-determined time-period, the snapshots generated at each occurrence of the pre-determined time-period;

checkpoints generated by said system of the hyper-table as stored on the table-store at each occurrence of the pre-determined time-period; and selections of one of a plurality of occurrences of the pre-determined time period, whereby a query of the snapshots of the indices and the checkpoints of the hyper-table may return query results based on the state of the indices and the hyper-table as of the selected occurrence of the pre-determined time-period, wherein said distributed device comprises a processor, a random-access memory, and a network interface connected to a network and is connected to a plurality of remote distributed devices, each of which comprises a processor, a random-access memory and a network interface connected to the network and is specially configured to store at least a portion of the data elements and at least a portion of the indices.

32. A non-transitory computer readable medium having computer readable instructions stored thereon for execution by a processor, wherein the instructions on the non-transitory computer readable medium are adapted to:

represent data-elements in a hyper-table stored in a table-store, wherein the data-elements are allocated to data-blocks stored in the table-store, wherein the table-store is located on a distributed device, wherein the hyper-table comprises: (i) hyper-rows representing the data-elements allocated to the data-blocks, (ii) at least one hyper-column associated with an attribute of the corresponding data-elements, and (iii) hyper-cells having data-values of the corresponding data-elements;

store a pre-determined time period on the distributed device;

generate indices of the hyper-rows and the at least one hyper-column for the corresponding data-elements, wherein the indices are located on the distributed device;

generate snapshots of the indices at each occurrence of the pre-determined time-period, wherein the snapshots comprise the indices as the indices existed at the occurrence of the pre-determined time-period;

generate checkpoints of the hyper-table at each occurrence of the pre-determined time-period; and select one of a plurality of occurrences of the pre-determined time period and query the snapshots of the indices and the checkpoints of the hyper-table to return query results based on the state of the indices and the hyper-table as of the selected occurrence of the pre-determined time-period, wherein said distributed device comprises a processor, a random-access memory, and a network interface connected to a network and is connected to a plurality of remote distributed devices, each of which comprises a processor, a random-access memory and a network interface connected to the network and is specially configured to store at least a portion of the data elements and at least a portion of indices.

* * * * *